United States Patent [19]

van Bavel et al.

[11] E Patent Number: Re. 31,864

[45] Reissued Date of Patent: Apr. 9, 1985

[54] SELF-TEST FEATURE FOR APPLIANCE OR ELECTRONIC SYSTEMS OPERATED BY MICROPROCESSOR

[75] Inventors: Michael G. van Bavel, Sugarland; Alan J. Shannon, Plano, both of Tex.

[73] Assignee: Texas Instruments Incorporated, Dallas, Tex.

[21] Appl. No.: 533,838

[22] Filed: Sep. 19, 1983

Related U.S. Patent Documents

Reissue of:

[64] Patent No.: 4,158,431
Issued: Jun. 19, 1979
Appl. No.: 749,487
Filed: Dec. 10, 1976

[51] Int. Cl.[3] ..... G06F 11/04

[52] U.S. Cl. ..... 371/20; 364/900; 340/309.4

[58] Field of Search ..... 371/18, 20; 364/200 MS File, 900 MS File; 340/309.4, 309.5

[56] References Cited

U.S. PATENT DOCUMENTS

| | | | |
|---|---|---|---|
| 3,829,842 | 8/1974 | Langdon et al. | 235/153 AK X |
| 3,855,461 | 12/1974 | Stockwell | 340/172.5 X |
| 3,866,171 | 2/1975 | Loshbough | 235/153 A X |
| 4,011,428 | 3/1977 | Fosnough et al. | 219/506 X |
| 4,028,536 | 6/1977 | Woodward | 235/153 AC X |
| 4,034,194 | 7/1977 | Thomas et al. | 235/154 AC |

OTHER PUBLICATIONS

Hewlett-Packard Journal, 6/75, p. 1-24, Describing a 2640 A CRT Terminal.

Model 2640 A Interactive Display Terminal Instalation & Service Manual, pp. 3-1 to 3-5/3-6, 5/75, Hewlett-Packard.

2644A Mini Data Station Reference Card, Hewlett-Packard, 10/75.

Composite Service Manual 264X, pp. 1-, 1-2, 2-24, 2-25, 8-1 and 8-2, Hewlett-Packard, 1975.

Model 3490 A Multimeter Operating and Service Manual, pp. 3-3, 4-9, 4-10, 4-11, 4-12, 4-16, 4-17, Hewlett-Packard 1972.

C. J. Duggan, Jr., "Microprogrammed Diagnostics for I/O Attachments", *IBM Tech. Disc. Bull.*, vol. 15, No. 7, 12-1972, pp. 2073-2075.

*Primary Examiner*—Jerry Smith
*Assistant Examiner*—Mark Ungerman
*Attorney, Agent, or Firm*—Leo N. Heiting; Melvin Sharp

[57] ABSTRACT

A microwave oven is disclosed as a typical appliance controlled by a microprocessor device. The oven has an LED digital display, a number of indicator LED's, and a capacitive touch keyboard, along with circuits for controlling a magnetron, a broiler unit, and a blower. A "self-test" feature causes the system to sequence through test routines whereby all LED's are lighted in a set order, each digit of the display counts up from 0 through 9, keyboard inputs entered are displayed as a code, and the magnetron and broiler are turned on.

25 Claims, 12 Drawing Figures

SELF-TEST FEATURE FOR APPLIANCE OR ELECTRONIC SYSTEMS OPERATED BY MICROPROCESSOR

Matter enclosed in heavy brackets [ ] appears in the original patent but forms no part of this reissue specification; matter printed in italics indicates the additions made by reissue.

BACKGROUND OF THE INVENTION

This invention relates to electronic systems and more particularly to self-testing of equipment such as home appliances operated by microprocessor devices.

Most appliances or electronic equipment such as microwave ovens, washing machines, CB radios, TV game devices, automobile ignition controls, and the like are being designed to be controlled by microprocessors. Usually a microprocessor for these purposes is a semiconductor MOS/LSI integrated circuit which has a read only memory (ROM), data storage in the form of a random access memory (RAM), an arithmetic unit for performing calculations or logic functions, and a number of input and output terminals. An example of a processor device of this type is described in detail in U.S. Pat. No. 3,988,604 issued Oct. 26, 1976 to J. H. Raymond, assigned to Texas Instruments. The processor device contains facility for being tested, as a finished part, according to U.S. Pat. No. 3,921,142, assigned to Texas Instruments, but the system itself requires functional testing of each electrical component, either for final test by the manufacturer or for field test by a serviceman. Conventionally, systems test has required various equipment such as volt and ohm meters, oscilloscopes and the like, and can be time consuming and expensive. Testing is further complicated by the fact that solid state control circuitry has few components and thus few terminals are available for probe or for initiating conditions.

It is therefore the principal object of the invention to provide an improved testing arrangement for appliances or electronic equipment. Another object is to provide a self-test feature for apparatus controlled by a microprocessor. A further object is to provide a self-test procedure which utilizes a minor part of an existing ROM in a processor device.

SUMMARY OF THE INVENTION

In accordance with an embodiment of the invention, an electrical appliance such as a microwave oven, for example, includes a self-test feature wherein all of the electrical devices such as the magnetron are actuated and the digital display and the indicator lights are all actuated in a pattern, this being accomplished by a microprocessor device which is the same device which controls the operation of the appliance. A capacitive touch keyboard or other manual input is provided, and the self-test feature may test the keyboard by displaying row and column data in response to touching each key. The self-test operation is initiated by connecting certain output and input terminals of the microprocessor device, in a way not encountered in ordinary operation, so that the keyboard is bypassed. Thus the keyboard itself can be tested.

THE DRAWINGS

The novel features believed characteristic of the invention are set forth in the appended claims. The invention itself however, as well as other features and advantages thereof, may best be understood by reference to the following detailed description of illustrative embodiments, when read in conjunction with the accompanying drawings, wherein:

DETAILED DESCRIPTION OF SPECIFIC EMBODIMENT

Figure 1:
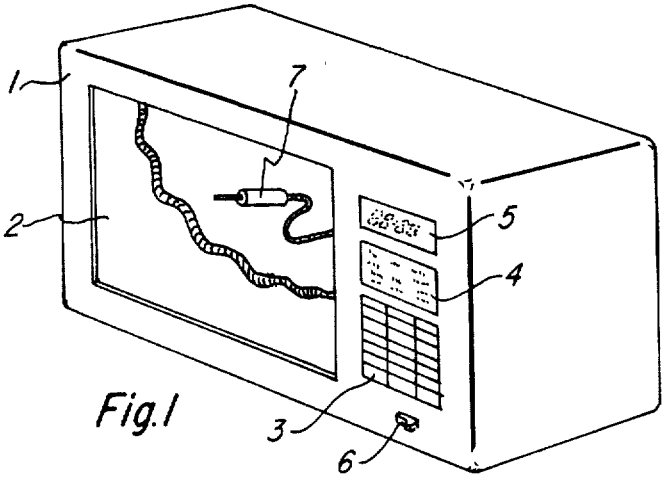
FIG. 1 is a pictorial view of a microwave oven controlled by a microprocessor which may use the self-test feature of the invention.
Figure 2:
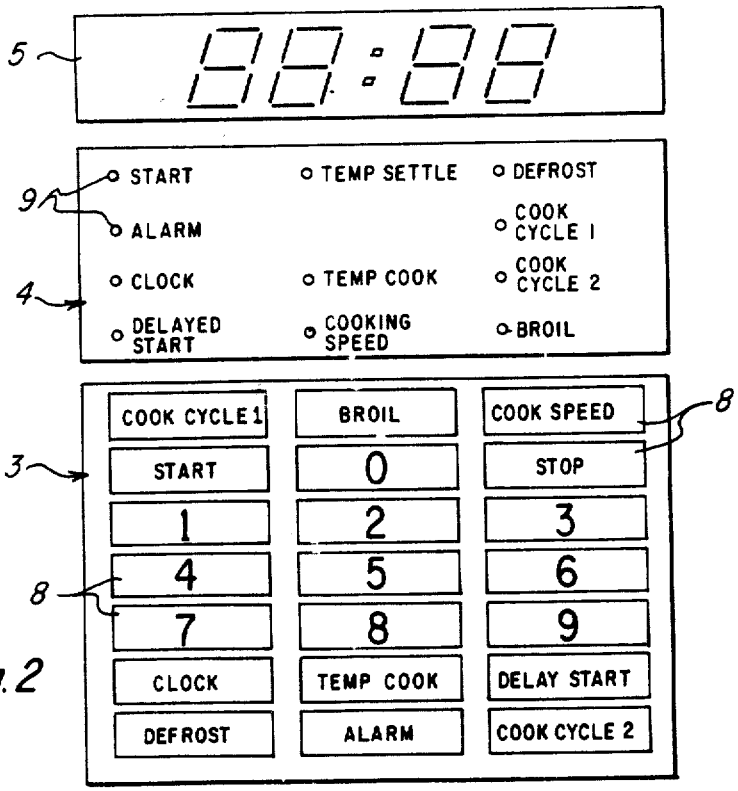
FIG. 2 is an enlarged view of the control panel of the appliance of FIG. 1.

With reference to FIG. 1, a microwave oven which is controlled by a microprocessor device and which may employ the self-test feature of the invention is illustrated in pictorial form. It is understood, of course, that this equipment is merely illustrative; the same concepts could be used in any system. The oven comprises a housing 1 which has a door 2 for access to a cooking compartment in the usual manner. A control and indicator panel has a keyboard 3 which may be of the capacitive touch type, although switches with mechanical contacts may be employed. An array of indicator lights 4 such as VLED's tell the operator what operation or cycle the oven is engaged in. A four digit display 5 shows the time remaining in a cook cycle, or time of day, or any other numerical information of use to the operator. An OFF/ON toggle switch 6 provides the typical power on or off function. A temperature probe 7 may be used within the cooking compartment, plugging into a receptacle provided in the sidewall. An enlarged view of the indicator and control panel is seen in FIG. 2. The keyboard 3 consists of a glass front panel which has twenty-one rectangular conductive areas 8 thereon. When touched by the operator, the capacitance of an area changes and this can be detected by the input circuitry. It is difficult to test this type of keyboard and its associated detector circuit because the parts cannot be reached and would be affected by test probes. The indicator lights 4 are typically small red light emitting diodes 9 which are covered by a glass panel that has legends printed thereon for each light. The display 5 consists of a seven-segment four-digit VLED device wherein all segments of like position are in common, of standard design. The operating sequences of this microwave oven control may be as later set forth, it being understood that the particular way of operation of the appliance is not part of the invention and different functions on the keyboard 3 and different indicators 4 and display 5 could be used.

Figure 3:
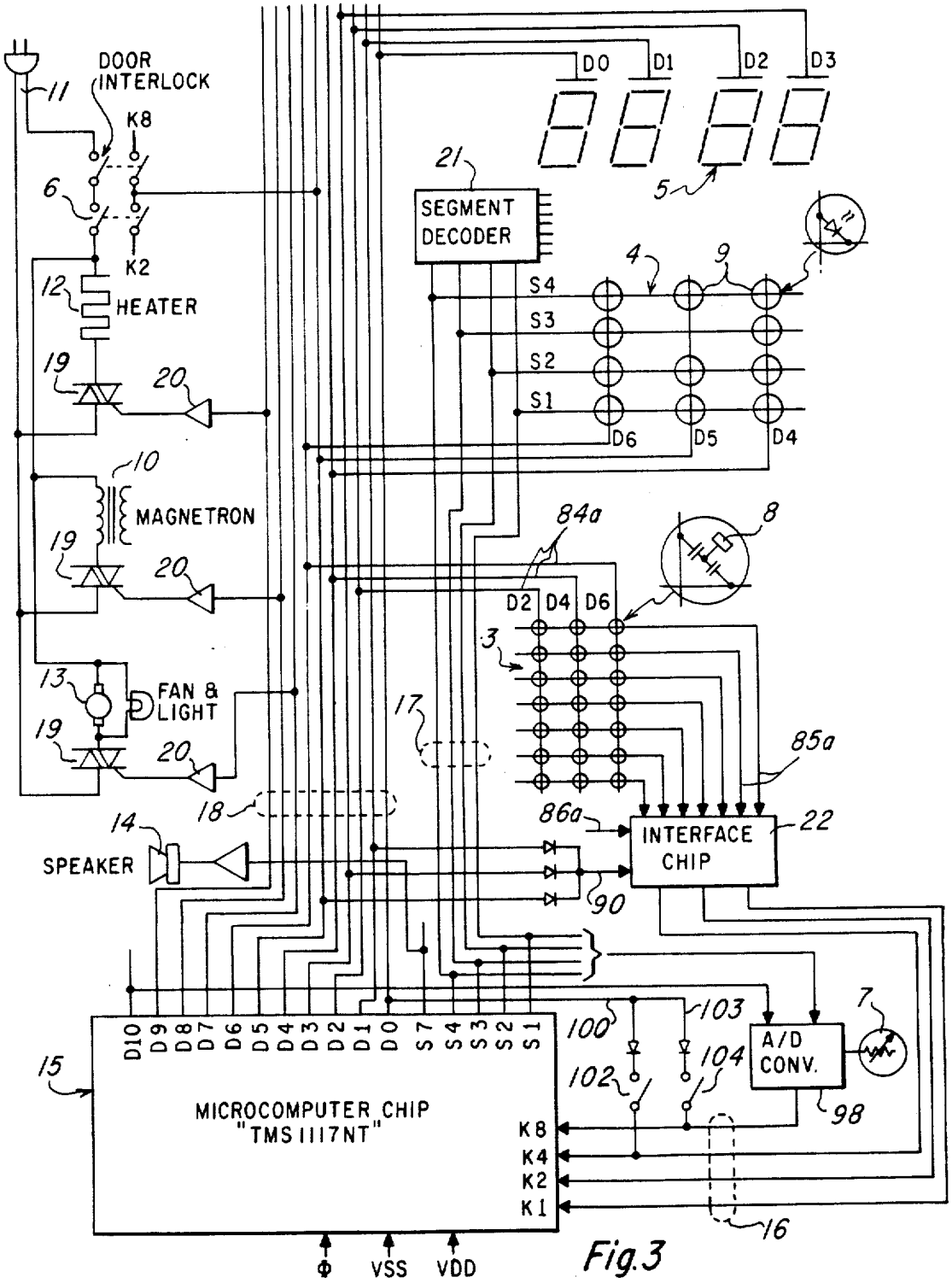
FIG. 3 is a block diagram of the electronic circuit of the appliance of FIGS. 1 and 2.

Referring to FIG. 3, an electrical diagram of the system of FIGS. 1 and 2 is shown. The principal cooking element of a microwave oven is of course a magnetron which generates microwave energy, and a magnetron transformer 10 is connected to the magnetron, not shown, and actuates it when the transformer primary is energized by AC supply 11. A heater 12 of the conventional electric resistance type within the cooking chamber provides a broil or browning function, also actuated from the AC supply 11. A fan motor and pilot lamp 13 within the cooking chamber come on when the door 2 is closed and the switch 6 is on. A buzzer 14 signals when a cycle is completed. The main part of the controller is a semiconductor MOS/LSI device or "chip" 15 which may be of the type made available by Texas Instruments Incorporated, P. O. Box 1443, Houston, Texas 77001 under the trade designation TMS1117NL Preprogrammed 4-Bit Microcomputer, or may be any one of various other microprocessor or microcomputer devices available from Texas Instruments under the general designation of TMS1000, TMS1100, TMS1200 or TMS1300, specially programmed to perform the functions to be described by reference to Programmer's Reference Manual, TMS1000 Series MOS/LSI One-Chip Microcomputer, Bullet CM122-1, Copyright 1975, published by Texas Instruments and available at the above address, such manual being encorporated herein by reference. The chip 15 is also described in detail in U.S. Pat. No. 3,988,604, above-mentioned. The chip 15 accepts input data from the keyboard 3 or other inputs such as from the probe 7 by four "K" lines 16 labelled K1, K2, K4 and K8. Two different independent sets of output lines from the chip 15 are provided, one being "S" or segment outputs 17 labelled, S1, S2, S3 and S7 (actually the chip could have seven or eight segment outputs as typically used for calculators or other seven segment plus decimal point displays). The other set of outputs is the "D" or digit output lines 18 of which there are eleven in this case, labelled D0 to D10 (the chip has sixteen possible "D" outputs in a forty pin package, less in a standard twenty-eight pin package). Suitable devices (not shown) such as bipolar transistors, optical couplers or the like may connect the various output pins to the display or controlled devices if different voltage or current levels are needed, as is conventional. A Vdd pin would provide supply voltage to the chip, and a Vss pin is ground. An oscillator input pin $\phi$ represents a frequency control for the system, as an internal clock generator is within the chip 15. For example, thrysistors 19 in series with the magnetron transformer 10, the broiler element 12 and the fan and lights 13 may be turned on by couplers 20 which are standard items available from Texas Instruments as TIL113 couplers. A segment decoder 21 such as available as a standard part SN7447A converts 4-bit binary-coded-decimal or other code on the S1 to S4 lines 17 to seven lines for driving the segments of the display 5. The signals generated by the capacitive touch keyboard 3 are converted to a three-line code for input to the chip 15 on lines 16 by an interface part 22 which is available from Texas Instruments under the trade designation TMS1976.

THE MICROCOMPUTER CHIP

One example of the microcomputer chip 15 will now be described. Depending upon the complexity of the functions to be implemented, the size of instruction word storage needed for the chip 15 might be 1K or 2K, for example. A TMS1000 device as mentioned above contains 1K storage, while a TMS1100 contains 2K. A 1K device will be described, although it can be expanded if needed for a complex system.

Figure 4A:
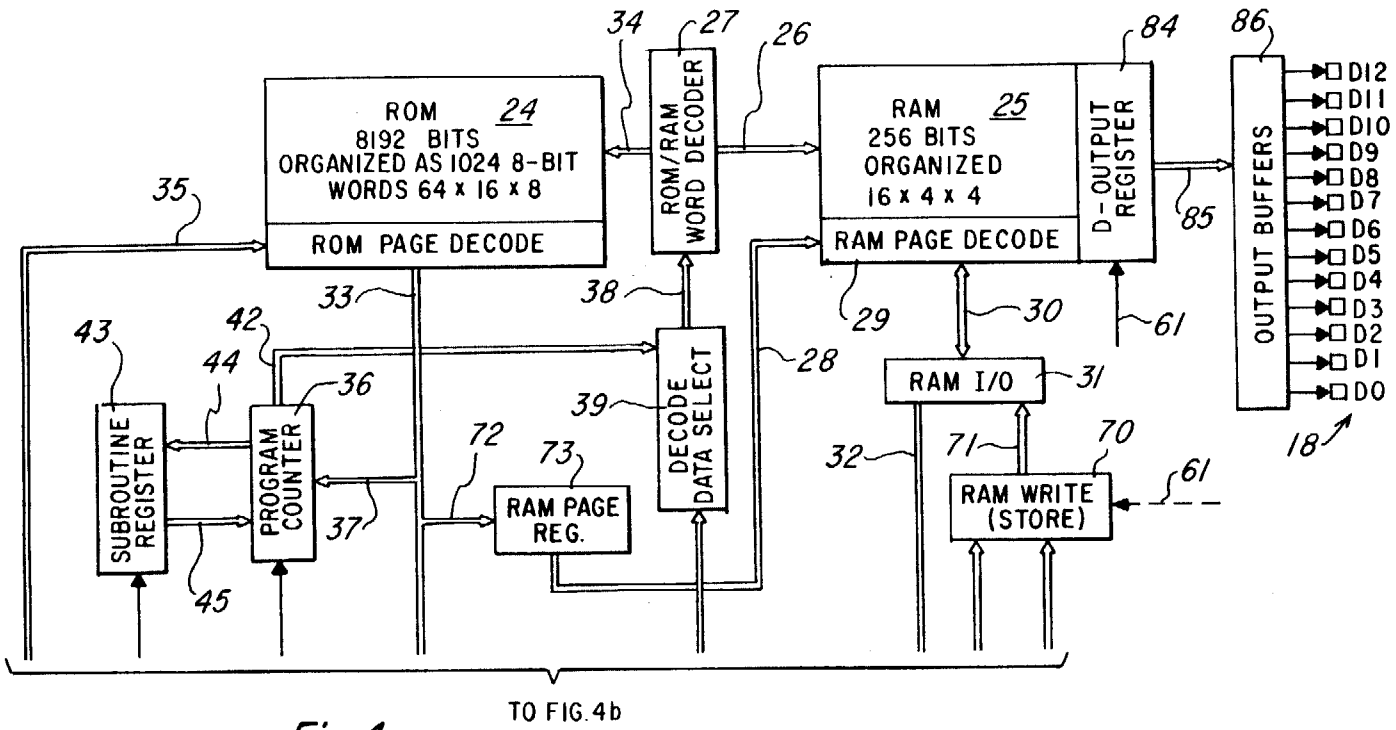
FIG. 4 is a block diagram of the microprocessor device in the system of FIG. 3.
Figure 4B:
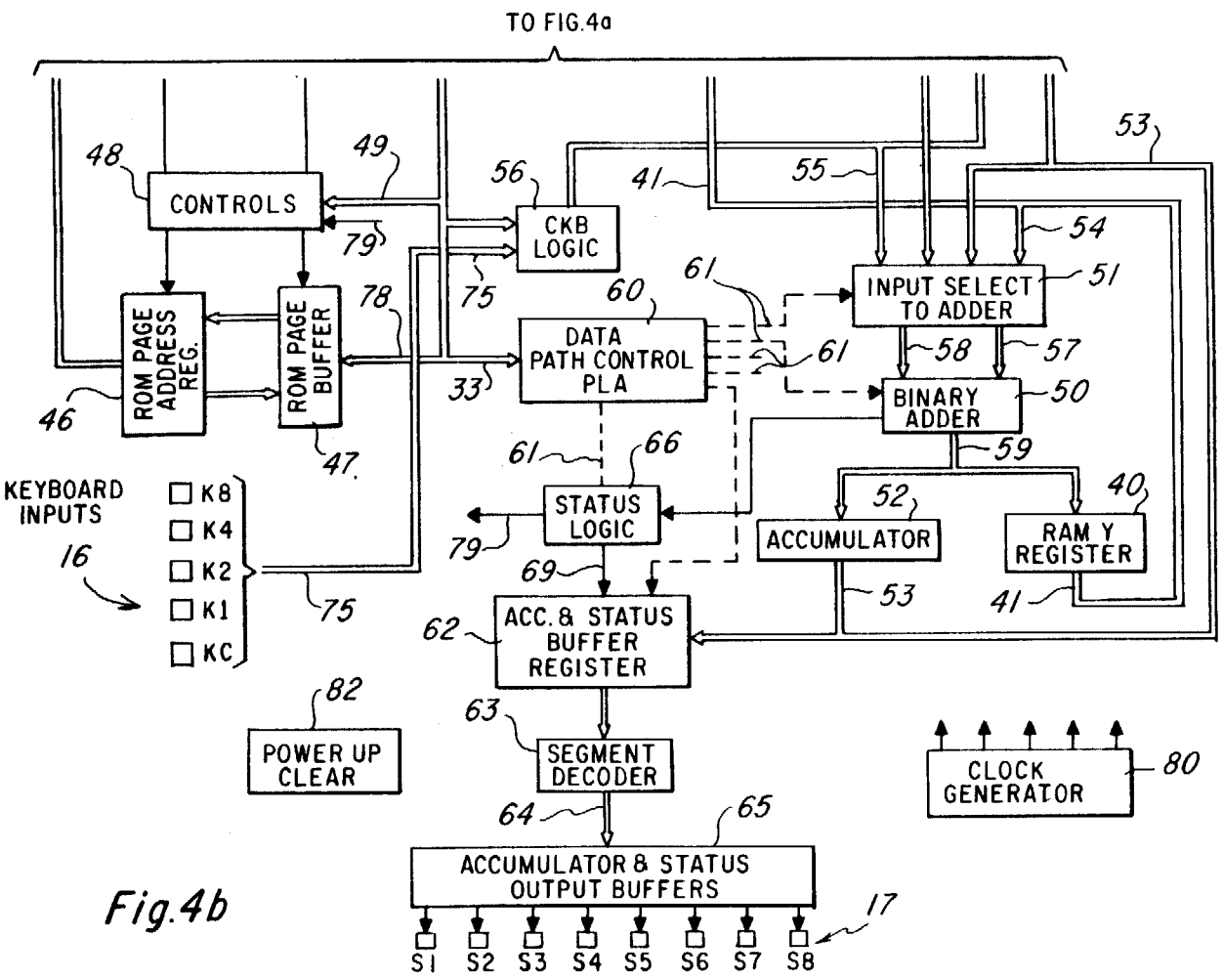

A block diagram of the system implemented on the chip 15 is shown in FIG. 4. The system is centered around a ROM (read-only-memeory) 24 and a RAM random-access-memory) 25. The ROM 24 contains 1024 instruction words of eight bits per word, and is used to store the program which operates the system. The RAM 25 contains 256 memory cells software organized as four sixteen-digit groups with four bits per digit. The RAM may store information entered by the keyboard, or intermediate and final results of calculations, as well as status information or "flags", and other working data. The RAM functions as the working registers of the system, although it is not organized in a hardware sense as separate registers as would be true if shift registers or the like were used for this purpose. The RAM is addressed by a word address on lines 26, i.e., one out of sixteen word lines in the RAM is selected, by means of a combined ROM and RAM word address decode circuit 27. One of four "pages" of the RAM is selected by an address signal on two lines 28 applied to a RAM page address decoder 29 in the RAM. For a given word address on lines 26 and page address on lines 28, four specific bits are accessed and read out on RAM I/O lines 30, via input/output circuit 31, to RAM read lines 32. Alternatively, data is written into the RAM 25 via the input/output circuitry 31 and the lines 30. The same sixteen lines 26 used as the RAM word address are also used to generate the display and keyboard scan on the lines 18; to this end the lines 26 pass through the RAM 25 and are connected to output registers and buffers as will be explained.

The ROM 24 produces an eight bit instruction word on ROM output lines 33 (the bits of the instruction word being labeled R0-R7) during each instruction cycle. The instruction is selected from 8192 bit locations in the ROM, organized into 1024 words containing eight bits each. The words are divided into sixteen groups or pages of sixty-four words each. To address an instruction in the ROM requires a one-of-sixty-four ROM word address on lines 34 and a one-of-sixteen ROM page address on lines 35. The ROM word address on lines 34 is generated in the same decoder 27 as used to generate the RAM word address on lines 26. The ROM word address is a six-bit address produced in a program counter 36 which is a six-stage shift register that may be updated with an instruction cycle or may have a six-bit address loaded into it via lines 37 from ROM output lines 33 for a call or branch operation. The RAM and ROM word address decoder 27 receives a six-bit encoded address on lines 38 from decode data select unit 39 which has two inputs. The unit 39 may receive a four-bit address from RAM Y register 40 via lines 41, or it may receive a six-bit address from the program counter 36 via lines 42. A six-bit subroutine register 43 is associated with the program counter 36 to serve as temporary storage for the return word address during subroutine operations. A six-bit address is stored in the register 43, via lines 44 when a call instruction is initiated so that this same address may be loaded back into the program counter 36 via lines 45 when execution of the subroutine which begins at the call location has been completed; this conserves instruction words and makes programming more flexible. The ROM page address on lines 35 is generated in a page address register 46 which also has a buffer register 47 associated with it for subroutine purposes. The register 46 will always contain the current page address for the ROM, and directly accesses the ROM page decoder. The buffer register 47 is a multifunction buffer and temporary storage register, the contents of which can be the present ROM page address, an alternate ROM page address, or the return page address during subroutine operations. The program counter, subroutine register and ROM page addressing are all controlled by control circuitry 48 which receives inputs from the ROM output lines 33 via lines 49. The control circuitry 48 determines whether branch and call on "status" or subroutine operations are performed, causes loading of an instruction word into the program counter and/or page address register, controls transfer of bits to the subroutine or buffer registers and back, controls updating of the program counter, etc.

Numerical data and other information is operated upon in the system by a binary adder 50 which is a bit-parallel adder having a precharged carry circuit, operating in binary with software BCD correction. The input to the adder 50 is determined by an input selector 51 which receives four-bit parallel inputs from several sources and selects from these what inputs are applied to the adder. First, the memory read or recall lines 32 from the RAM 25 provide one of the alternatives. Two registers receive the adder output, these being the "RAM Y" register 40 and an accumulator 52, and each of these has output lines separately connected as inputs 53 and 54 of the selector 51. A fourth input 55 receives an output from "CKB" logic as will be explained. Thus, the adder input is selected from the following sources: data memory or RAM 25 on lines 32; accumulator 52 via lines 53; RAM Y register 40 via lines 54; constant, keyboard or "bit" information from CKB logic 56 on lines 55. Positive and negative inputs to the adder 50 on lines 57 and 58 are produced from the selector circuitry 51.

The output from the adder 50 is applied to either or both the RAM Y register 40 and the accumulator 52 via lines 59. All of the operations of the adder 50 and its input selector 51, etc., are controlled by a data path control PLA 60 which is responsive to the instruction word on lines 33 from the ROM. Control outputs 61 from the control PLA 60 are indicated by dotted lines. The four-bit output from the accumulator can be applied via lines 53 to an accumulator output buffer 62 and thus to a segment decoder 63 for ouput from the system. The segment decoder 63 is a programmable logic array like that disclosed in application Ser. No. 163,565, and produces up to eight segment outputs on lines 64 which are applied to a set of eight output buffers 65. The output arrangement contains memory in the buffer 62 so that an output digit can be held for more than one machine cycle. Output is under control of the data control logic PLA 60 which is responsive to the instruction word on lines 33 from the ROM.

A status logic circuit 66 provides the function of examining for carry or compare from the adder 50, and determining whether to branch or call. To this end, inputs from the adder 50 via lines 67, and input from the control PLA 60 via lines 61 are provided. The status logic 66 includes a latch which produces an output 69 to the output buffer register 62; this can be decoded out via segment decode 62 in many different ways. It can be used to indicate decimal point DPT, and used to select two digit code sequences such as seven-segment or BCD out of the same PLA. For DPT, a BCD code of the desired DPT place would be stored in a location in RAM 25, and this would be compared in adder 50 with the current D line 18 being actuated which is defined in RAM Y register 40, and if they are the same, status latch is set and DPT is shown on the display for that digit. Further, the status latch can be used to delineate between BCD data out on certain lines 17, and control outputs on other lines 17.

A control circuit 70 determines what and when data is written into or stored in the RAM 25 via input/output control 31 and lines 30. This RAM write control 70 receives inputs from either the accumulator 52 via lines 53 or the CKB logic 56 via lines 55, and this circuit produces an output on lines 71 which go to the RAM I/O circuit 31. Selection of what is written into the RAM is made by the instruction word on lines 33, via the data path control PLA 60 and command lines 61. An important feature of the system is that constants or keyboard information, from CKB logic 56, as well as the adder output via the accumulator, may be written into the RAM, via the write control 70, and further the CKB logic 56 can be used to control the setting and resetting of bits in the RAM, via the write control 70.

The RAM page address into which data is written is determined by two bits of the instruction word on lines 33, as applied via lines 72 to a RAM page address register 73 and thus to lines 28 which select the RAM page. The RAM word or Y address is of course selected by the contents of RAM Y register 40, select circuit 39 and decoder 27.

The four keyboard inputs 16 appear on lines 75, from which an input to the CKB logic 56 is provided. In normal operation, a keyboard input goes via CKB logic 56 to the accumulator 52 or RAM Y register 40, from whence it is examined by software or ROM programming. In manufacture of the chips, a test mode is possible, where the keyboard input on lines 75 can be entered directly into the ROM page buffer address register 46, as will be explained. Also, during hardware clear using the KC input, the K lines can be entered into the page address register, or a K line can be used as an interrupt, in non-calculator applications.

Also included within the chip 15 is a clock oscillator and generator 80 which generates internally a basic clock frequency of about 500 KHz or less, and from this produces five clocks $\phi 1$ to $\phi 5$ used throughout the system. A power-up-clear circuit 82 produces controls which clear the calculator when the power is turned on. This may be also supplemented by the KC input with an external capacitor.

The outputs 18 from the chip 15, used for keyboard and display scanning, are generated from the RAM word address on lines 26 by an output register 84 which is loaded under control of lines 61 as addressed by RAM word lines 26. The output from the register 84 is connected via lines 85 to a set of output buffers 86. Sixteen outputs are possible, but only perhaps nine to thirteen would be provided as outputs in a typical calculator design; for example eight digits for mantissa, two for exponents, and two for annotators such as minus sign for mantissa and exponent.

It is important that the register 84 is a random access register, where all bits are separately, independently, and mutually exclusively addressed. In this embodiment, only thirteen stages are provided in the register 84, so only the first thirteen of the sixteen address lines 26 are used. When one of the twelve bits in the register 84 is addressed from decoder 27, this bit may be either set or reset as determined by controls 61 from the control PLA, i.e., from the current instruction word. The bit will remain set or reset until again specifically addressed and changed; meanwhile any or all of the other bits my be addressed and and set or reset in any order. Thus, it is possible to have any combination of D register bits either set or reset, providing $2^{13}$ or 8192 code combinations on the output lines 18. During power up or hardware clear, all the bits of the register 84 are unconditionally reset.

Similar to the register 84, the other output register 62 is static in that the contents once entered will remain until intentionally altered. The output register 62 functions as an output data buffer while the accumulator 52 and status latch 66 are being manipulated to form the next output. The output register 84 is a similar buffer for outputting the contents of the Y register 40, but has the additional feature of being fully random access. The data sources for the Y register 40 are the following: a four-bit constant stored in the ROM 24 as part of an instruction word; the accumulator 52 transferred to the Y register 40 via the selector 51 and adder 50; and data directly from the RAM 25. Once data is in the Y register 40 it can be manipulated by additional instructions such as increment or decrement.

An instruction set and explanation of each instruction implemented in the system of FIG. 4 is set forth in the attached Table I. It is important to note that the system can actuate any one or any combination of the S and D output lines 17 and 18, independently of one another, and is responsive to the K input lines 16, or any one or set of them, only when instructed. Thus, the various segments of the display 3, or the indicator lamps 9, or the thyristors 19, or the buzzer 14, etc. may be actuated as needed, and the K inputs checked as needed. The cycle time of the chip for executing an instruction is about twelve to fifteen microseconds, so many hundreds of instructions may be executed in a time less than perceptible by the operator.

THE CAPACITIVE KEYBOARD INTERFACE CHIP

Figure 5:
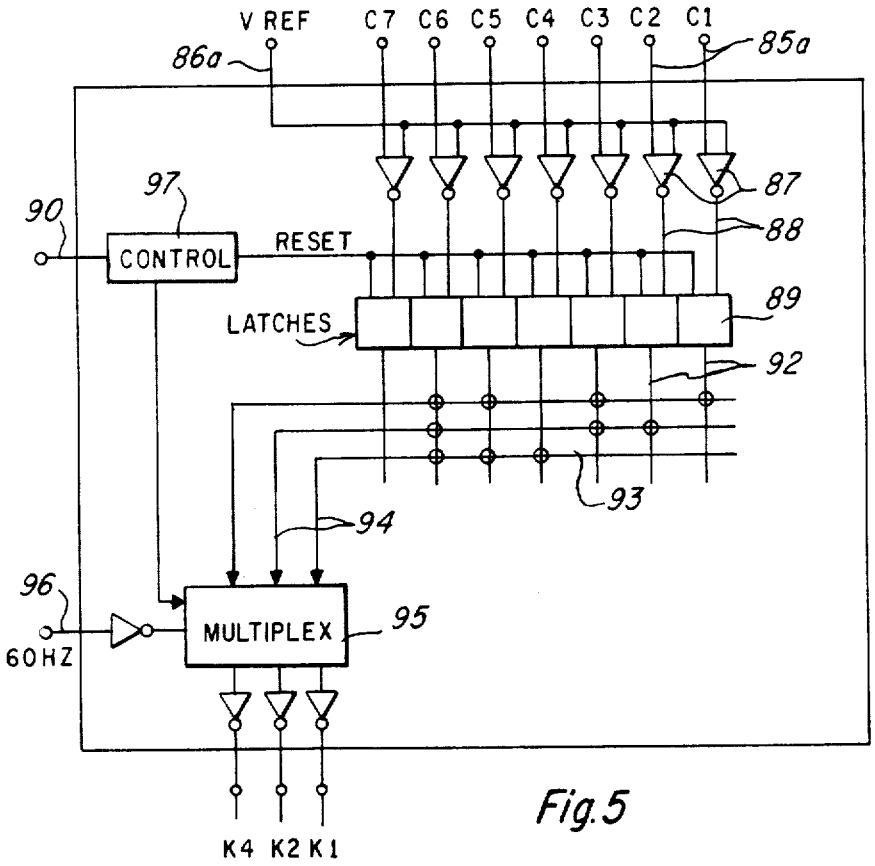
FIG. 5 is a block diagram of the keyboard interface device in the system of FIG. 3.
Figure 6:
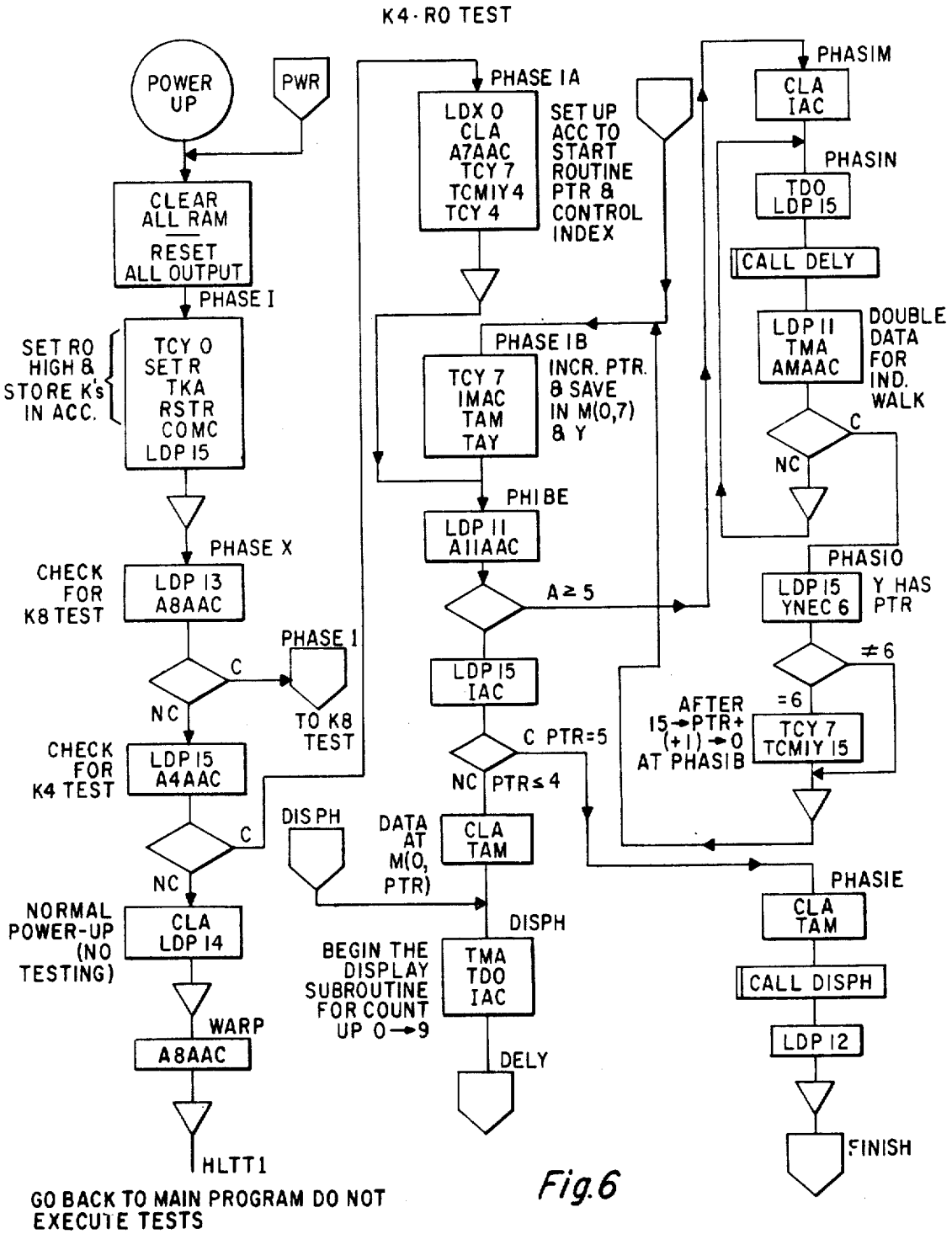
FIGS. 6–11 are flow charts of a program which may be used in the microprocessor device of FIG. 3 for self-test of the appliance of FIGS. 1 and 2.
Figure 7:
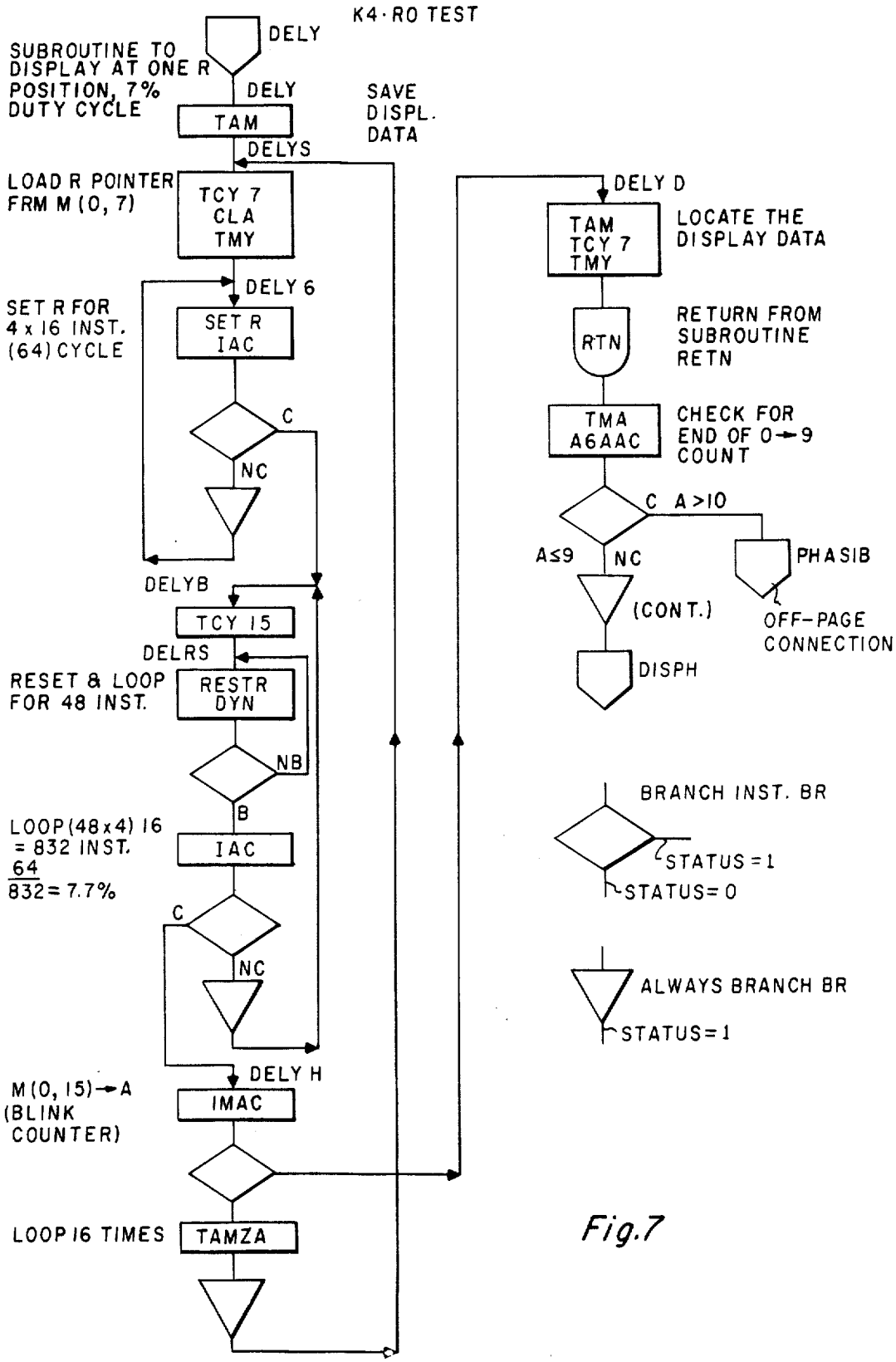
Figure 8:
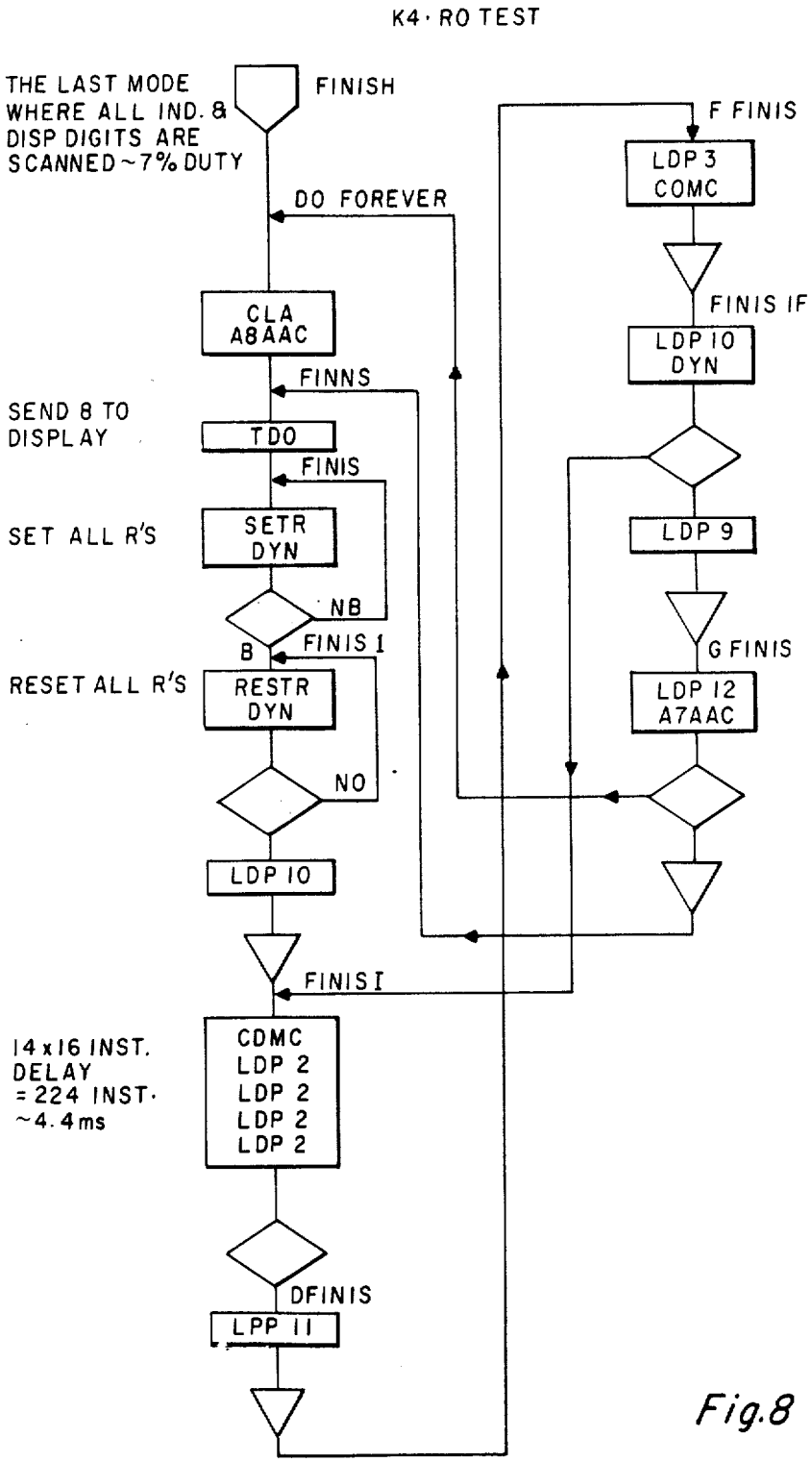
Figure 9:
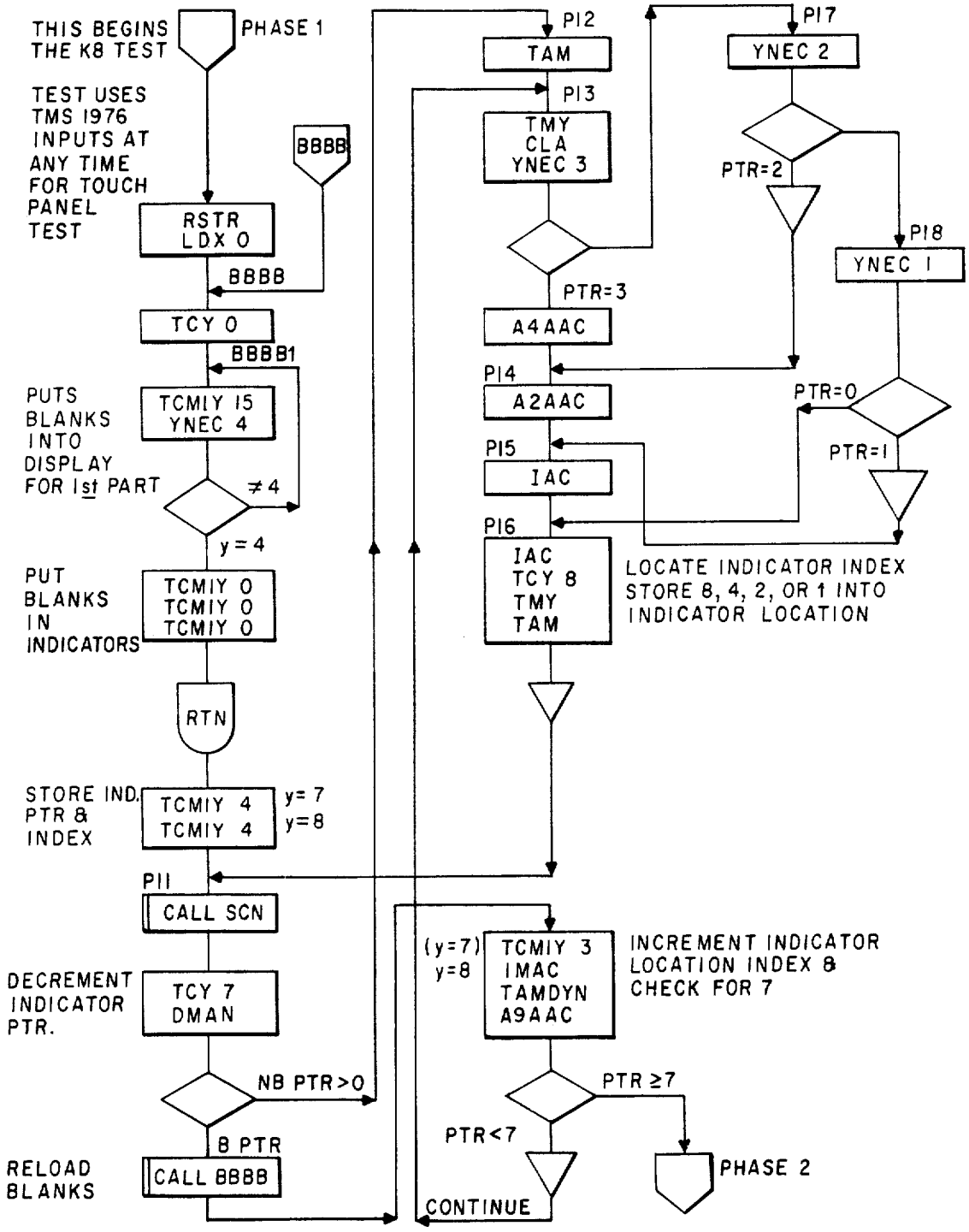
Figure 10:
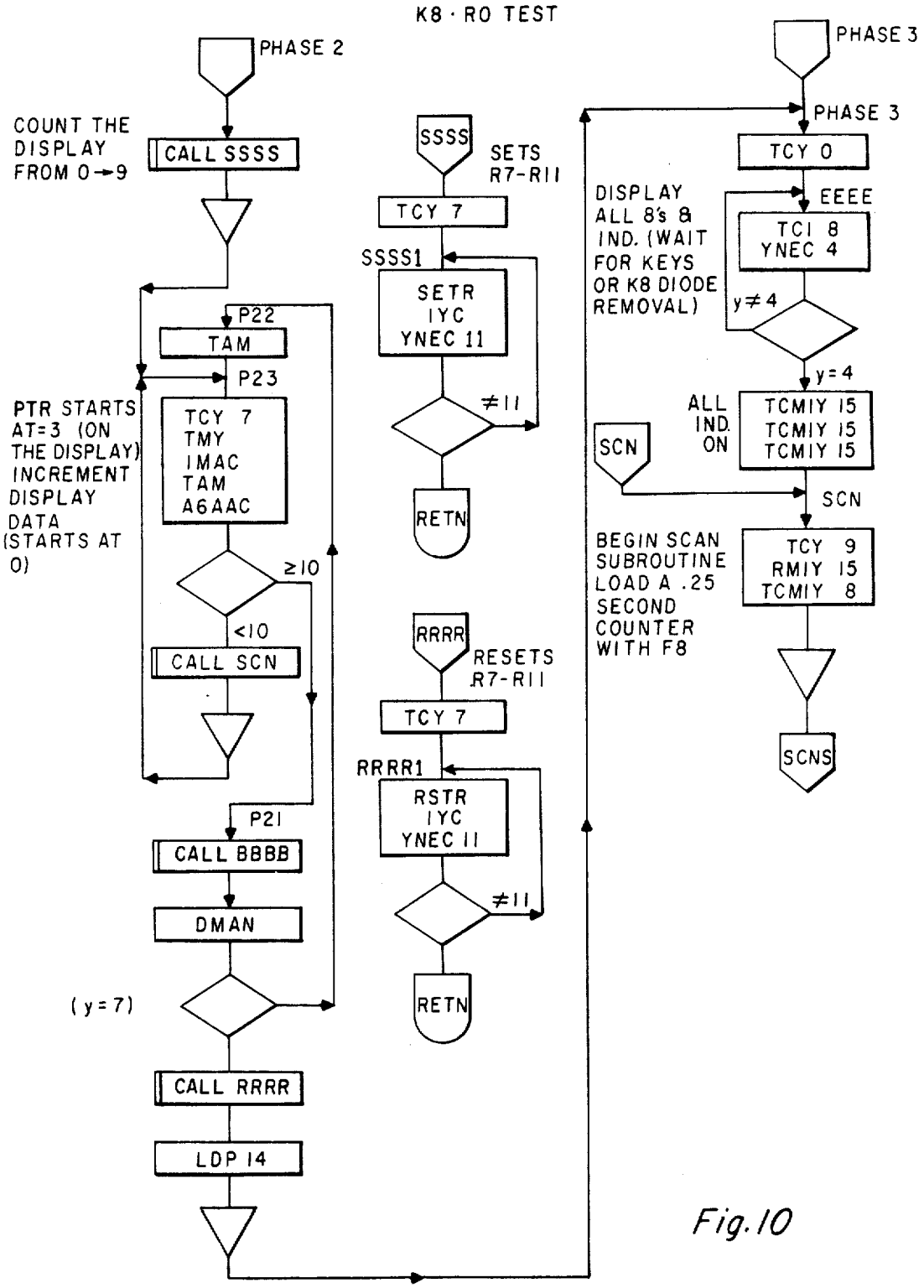
Figure 11:
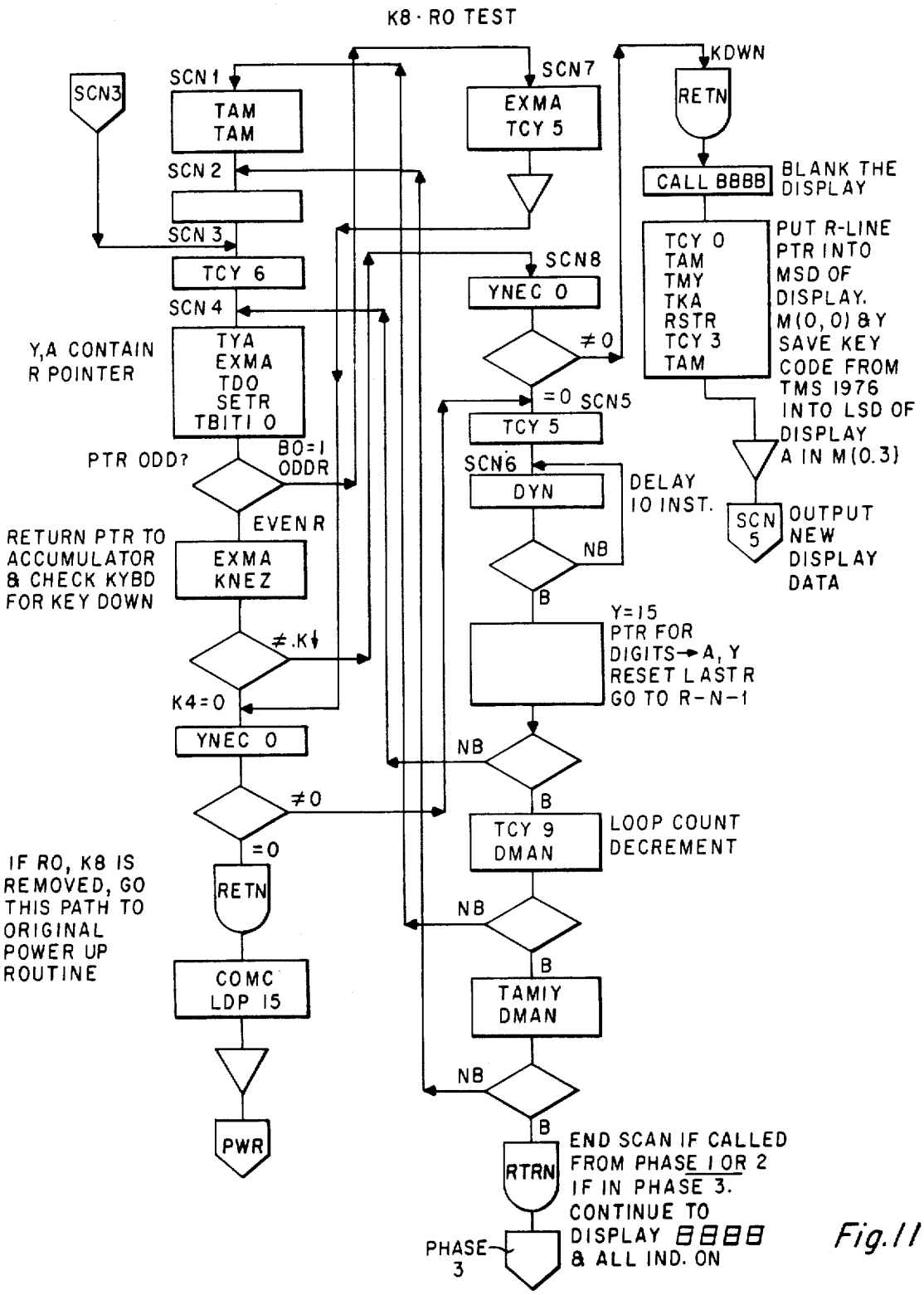

Referring to FIG. 5, a block diagram of the interface chip 22 is shown. The capacitive keys are driven by lines 84a which are at high voltage, boosted up from the D2, D4 and D6 lines 17 by buffers, not shown, so that the level distinction on lines 85a going from the array 3 to the chip 22 is reliable. A scan pulse from a D line 5 causing a line 84a to be actuated, but with no key area 8 touched, generates transitions of the C lines 85 that need to be 0.5 volts less positive than a reference voltage applied to a reference voltage input pin 86a. The voltage reference is generated by resistors forming a voltage divider across a DC supply. By touching a key, the voltage becomes at least 0.3 volts more positive than the reference voltage. Vref is adjusted to a value halfway between not detecting and detecting a key area 8 being touched. A set of seven input buffers 87 function to compare Vred in line 86a with the voltages on the lines 85a and produce an output on one of the lines 88 when a key is touched at the time D2, D4 or D6 is actuated. The lines 88 drive a set of seven latch circuits 89 so that when a key is touched one of the latches will flip and stay until reset by a reset voltage on a line 90. Protection against double key actuation may be provided by disabling the buffers 87 when one latch is flipped so the device is not responsive to a subsequent key. The reset line 90 is actuated by either D1, D3 or D5 via diodes 91 (seen in FIG. 4), so that the usual sequence is scanning D1 through D6 to provide "a reset, address D2, reset, address D4, reset, address D6" sequence. The outputs of the latches 89 are applied via lines 92 to a coder 93 which converts the one-of-seven actuation in lines 92 to a three-bit code on lines 94 for entry into the chip 15 via K lines K1, K2, K4. The lines 94 are applied to a multiplexer 95 which functions to switch between the keyboard data on the lines 94 and a 60 Hz input on a line 96 from the prior line. This allows a 60 Hz reference to operate the device as a clock for time-of-day display. The multiplexer 95 is operated by the D1, D3, D5 signal on line 90 via control 97. The device of FIG. 5, commercially available under the part number TMS1976 as mentioned above, actually has nine inputs 85a and four outputs to the K lines, but only seven and three are needed here.

OPERATION OF THE MICROWAVE OVEN CONTROLLER

The normal operating procedure for the system thus far described will now be explained. When the oven is not being used, the chip 15 is functioning as a clock, storing time-of-day in the RAM 25 by counting 60 Hz. The time-of-day is output to the display 5 in hours-minutes. To reset the clock, the clock key is touched on the keyboard 3 and the current time is entered as a four-digit hours-minutes number by touching the number areas on the keyboard 3. During this, the lamp 9 for clock will be actuated in the indicator panel 4. Then the START key area 8 is touched, and the clock will thereafter function, continuously showing the time-of-day on the display 5. The START light 9 comes on when START key is touched. Thereafter, time is shown on the display unless a cooling procedure is being programmed or in process.

Independent of all other operations an alarm timer may be used by touching the ALARM key and then entering digits 0–9 to a maximum of 99:59. A countdown begins by touching the START pad, and the display 5 shows the time remaining. When the selected time has elapsed, the chip 15 actuates S7 to average the buzzer 14 at about 3 KHZ for three seconds, then the display goes back to time-of-day.

Timed cooking is of course the main operation of interest. The oven has five sequential programs, each having an associated timer. The cooking programs execute in a fixed order: (1) defrost; (2) automatic temperature settle; cook cycle 1; cook cycle 2; and broil. The cooking commands may be entered in any order, however.

If the temperature probe 7 is disconnected from its socket, all five cooking times are available. Each function is programmed by touching the desired function pad 8 followed with a data entry. Touching another function or the start pad stores the timer data. All functions programmed into a sequence have an associated indicator light 9 come on and say on.

With door interlock closed, the start pad 8 initiates a given sequence. Then the timer executing a count down is on display 5 while only its indicator is on. If the door 2 is opened at any time, cooking halts. The sequence restarts after the door is closed and start is hit. To end a sequence, touching STOP cancels all programming and turns off the magnetron/broiler power. Then reprogramming the timers is enabled. Once a sequence completes cooking, the speaker 14 sounds out three KHz bursts lasting one second out of five, for five minutes. The stop command terminates the speaker signal.

The cook can select a defrost period with an automatic temperature settling period afterwards. The defrost timer provides 60:00 minutes maximum cooking period at 15 seconds on, 15 seconds off cycle. This function is always the first one executed after the START pad is touched. If the defrost cycle is not selected, both defrost and the temperature settle are skipped. During a temperature settling period, no power is sent to the magnetron for a period equal to the defrost time. While the temperature settles, an indicator 9 is lit. To use the temperature settling feature, cook cycle one has to be programmed.

Two cooking timers are programmable, cook cycle 1 and cook cycle 2. Cook cycle 1 counts down 60:00 minutes maximum. Cook cycle 2 counts down from 30:00 minutes maximum. Optionally, the user selects the cooking speed in 10% duty-cycle increments of a 30 second time base (e.g., a 10% duty-cycle would turn on the magnetron 3 seconds out of 30). If not selected, full 100% duty-cycle is the assumed magnetron on-time.

A typical sequence using cook cycle 1 and cook cycle 2 is programmed by touching DEFROST then entering a time such as 2-3-0 or two minutes and thirty seconds. Then COOK CYCLE 1 is touched on the keyboard 3 and a time is entered such as 5-0-0-0 or fifty minutes. Then COOK CYCLE 2 is touched and another time enetered by the keyboard, such as 1-5-3-0 or fifteen minutes and thirty seconds. At this point, indicator lamps 9 on the panel 4 which are actuated are CC1, CC2 and DEFROST. Then, START is touched, and START and DEFROST lights 9 come on, and the display shows 2:30. The defrost cycle begins counting down from 2:30. After five seconds, the start indicator goes off. A settling time equal to two minutes, 30 seconds follows. Then cook cycles 1 and 2 execute with a 100% duty cycle default. At the end of cycle 2, the ready signal sounds, and the display shows the time of day.

When programmed as just described, the magnetron is on 100% duty cycle. To change this, the cook SPEED key is touched after a cook time is entered, followed by a digit "1" to "9" for 10% to 90%. When this done, the SPEED light 9 comes on on the panel 4. During the cook cycle, the percentage displays in the two left hand digits of display 5, every ten seconds.

To obtain a crust on the food, the heating element 12 is controlled by a broil timer. Up to 30:00 minutes may be entered after touching the BROIL pad. Following cook cycle 2, a dedicated output, D9, turns on the broiler for the designated time.

In many instances the user may desire cooking to be done at a specific time. The system computes the time to start the cooking sequence by subtracting the total of all cooking times entered from the desired end time. After touching the DELAYED START pad, the cook selects an end time with the digit pads 8. The remainder of the cooking sequence is set, and then the calculation begins with a START entry. When the clock and the start time agree, the cooking mode begins automatically. The delayed start indication goes away, and the first cooking timer and its indicator are enabled. Delayed start allows cooking to finish on time regardless of the cook's presence. Also delayed start eliminates any errors in subtracting minutes and seconds for up to five timers. It would be in error to try ending a one hour sequence at 12:30 if it was currently 12 o'clock. Once the desired end time is entered and some cooking sequence is enabled, the user touches START. Then the delayed start indicator goes on, the start indicator lites, and the oven lamp/fan 13 turns off. When the right time for beginning occurs, the lamp/fan goes on, the delayed start indicator turns off, and the selected cooking sequence begins as shown in the previous cooking descriptions. If temperature cooking is enabled, the cooking begins 30 minutes before the desired end time.

Using a thermistor in the probe 7 and an analog-to-digital conversion by successive approximation using a number of resistors actuated by S1, S2, S3 and S4, the system provides a temperature controlled cooking. First, a safety procedure checks to be sure the temperature probe 7 is in its socket. Otherwise one could start temperature cooking while forgetting to put the probe 7 inside the oven (which can result in overcooking). A 90 minute maximum time limit is allowed for the probe to reach the desired temperature before the oven automatically stops cooking.

Once the temperature probe 7 is properly connected and inside the food, the cook closes the door 2 and enters a sequence such as TEMP COOK then "4", followed by COOK SPEED, etc. or START.

The programmed temperature is relative on a scale of one (lowest) to nine (highest). The sensed temperature displays on the right on a zero to nine scale. The temperature updates are once a second. The actual temperature sensed varies with the choice of sensor and the external resistors used in the A/D converter 98. Every ten seconds the cooking speed percentage displays on the two left-hand digits, unless the 100% default is used. Entry to the chip 15 from the A/D converter 98 is by the K2 line, which is a binary indication. Thus, the chip actuates the S1–S4 lines in various combinations until the K2 line changes to produce a temperature indication.

SELF-TEST

In accordance with the invention, the chip 15 is programmed to test the system of FIGS. 1–3 as well as test itself working in the system. This capability may be used in several ways. The chip 15 may perform an incoming functional test upon itself, by having an oven mock up at the test location and plugging each chip 15, as received by the oven manufacturer, into it so that it can run through a test sequence with no elaborate test machinery. Another use is for production burn-in; often an appliance is "burned in" after manufacture to assure that parts which are to fail in a short period of power-on will be found. The self-test feature may be used, of course, for final test of the oven units before shipping, or by a retail store upon receipt or upon sale. Further, field test by a repairman in the home or at a repair center may use the self-test feature. Also, a customer may be directed to check his own unit in the home before a "house-call" by a field serviceman.

The system contains two separate self-test capabilities. These are independently actuated; one or both may be used. The first routine may be done without a keyboard and is relatively quick, thus it is well suited for incoming inspection. The second routine is suited for final test and field service testing; this routine exercises the keyboard 3, the interface device 22, the display, and all of the output devices, all via the chip 15.

The first test routine is actuated by connecting the output line D0 to the input line K4 by a line 100, a diode and a switch 102. The switch 102 is closed before power is applied to the system. When the chip senses K4 actuated when D0 is actuated, the routine begins, and the switch 102 may then be opened; i.e., only a momentary contact is needed. The first test routine consisting of three test operations which are automatically executed. The initial one of these first turns each LED indicator lamp 9 on, one at a time, for a short period, perhaps 0.2 second. The sequence is BROIL, CC2, CC1, DEFROST, COOK SPEED, TEMP COOK, blank (S2, D5 intersection), TEMP SETTLE, DELAYED START, CLOCK, ALARM, START. Next, each digit of the display 5, starting with the MSD, is counted from 0 to 9 at approximately 0.2 second count rate. Then, all D and S control lines (except S7 which actuates the buzzer or speaker 14) are turned on simultaneously. During these three operations, all indicator lamps 9 in the panel 4, all segments of all digits of the display 5, and all control outputs are exercised (except the buzzer, and this is avoided only to reduce noise in burn-in or test areas). The system will remain in the final state with all control outputs, all indicators, and all display elements turned on until power is removed—this condition is ideal for burn-in.

The second test routine is activated by connecting output D0 to input K8 by a line 103, a diode and a switch 104. This routine consists of four test operations, the first three of which execute automatically in serial after initiation, then the system stops in a hold condition until the user starts the fourth operation via keyboard inputs. In the first operation, each individual LED indicator lamp 9 is turned on in sequence for about one-fourth second each. In the second operation, each digit of the display starting with LSD is counted up from 0 to 9 at 0.25 second count rate. The third operation sets all D and S lines on, then terminates by going into a hold mode. These control outputs are not left on as they were in the first test routine. The fourth test operation requires the operator to touch the keys. When one of the key areas 8 is touched and released, the MSD of the display 5 shows the D line (i.e., "2", "4" or "6") which scans the touched key, and the LSD shows the C line 85 (input to the interface chip 22) on which the touched key exists. The following list shows the display activated for each key touched:

| KEY TOUCHED | DISPLAY |
|---|---|
| Cook Cycle 1 | 2-1 |
| Start | 2-2 |
| 1 | 2-3 |
| 4 | 2-4 |
| 7 | 2-5 |
| Clock | 2-6 |
| Defrost | 2-7 |
| Broil | 4-1 |
| 0 | 4-2 |
| 5 | 4-4 |
| 8 | 4-5 |
| Temp. Cook | 4-6 |
| Aux. Timer | 4-7 |
| Cook Speed | 6-1 |
| Stop | 6-2 |
| 3 | 6-3 |
| 6 | 6-4 |
| 9 | 6-5 |
| Delay Start | 6-6 |

Each key touched will activate a C and D line combination resulting in the display appearing for 0.8 seconds, after which the controller returns the system to the all lights on mode, showing 88:88 in the display 5, where it remains until another key is touched. After the operator has exercised all the keys (i.e., tests) desired, and the system is at rest in the all lights on mode, opening the switch 104 removing the connection from K8 to D0 causes the system to revert to the normal operating mode.

The first test routine executes itself in about five seconds, while the second test routine requires thirteen seconds (not including the fourth operation requiring key operation).

The program fixed in the ROM 24 to implement the test routines just described is set forth in FIGS. 6–11, which are flow charts giving the mnemonics of the instruction set of the Table. Other microcomputer chips 15 may have different instruction sets, but would be programmed in a similar manner. These routines are described in reference to a microwave oven with a digital display, indicator lights, and a touch keyboard, but the same principles could be used on any appliance or electrical equipment which had devices corresponding to a visible display, indicators, key inputs and the like.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

TABLE OF INSTRUCTIONS

CALL: 11XXXXXX

Conditional on status; if status line 79 is a logic "0", then the CALL instruction is not performed. If status is "1", the machine goes into the CALL mode, as indicated by setting the CALL latch 200 to a logic "1". The program counter 36 is stored up in the subroutine register 43. The page address is stored in the buffer 47. The contents of the buffer register 47 are used as the page address. The W field R2 to R7 of the instruction word is loaded into the program counter 36 via devices 162. All instructions executed while in the CALL mode perform their normal functions, except for the CALL and branch instructions; execution of a CALL within a CALL mode is not valid; branches executed within a call mode must be intrapage.

Branch (BR): 10XXXXXX

Conditional on status; if status is a logic "0", then the branch instruction is not performed. If status is "1", then the W field is loaded into the program counter 36 and the contents of the buffer register 47 become the new page address in the register 46, except when in the CALL mode. Branch (as well as CALL) can be unconditional because of the nature of status logic 66. Status is normally in logic "1" which is the proper condition for successfully performing a branch or CALL. If the instruction immediately preceeding the branch or CALL does not affect status, then the operation will be successful. Status is valid for only one instruction cycle. It is therefore invalid to perform multiple tests before a branch operation. Only that instruction immediately preceeding the branch instruction determines whether branching is successful. Status always returns to logic "1" after a branch instruction.

Load Y Register with a Constant (TCY): 0100XXXX

The C field of the instruction word, bits R4 thru R7, is transferred into the Y register 40. This is unconditional, and neither carry nor compare go to status logic 66.

Compare Y Register to a Constant (YNEC): 0101XXXX

The contents of the Y register 40 are compared to the C field of the instruction word. Compare information on line 67 is input to the status logic 66. Inequality will force status to a logical "1". This instruction is not conditional on status.

Constant Store, Increment Y Register (TCMIY): 0110XXXX

The contents of the C field is stored directly into the memory location addressed by the X and Y registers 73 and 40. The Y register 40 is then incremented by one. The instruction is not conditional on status, and carry and compare do not go to status.

Add constant to Acc, result to Acc, with carry (A2AAC) (or A3AAC, etc.)

A constant is added to the contents of the accumulator and the result stored in the accumulator. If a carry is generated, status is set.

Load P Register (LDP): 0001XXXX

The buff register 47 is loaded with the contents of the C field in the instruction word. This is unconditional and neither carry nor compare go to status.

Bit Set (SBIT): 001100XX

The contents of the memory location addressed by the X and Y registers 73 and 40 is selected. One of the four bits, as selected by the B field of the instruction word, is set to a logic "1".

Bit Reset (RBIT): 001101XX

The contents of the RAM 25 memory location addressed by the X and Y registers 73 and 40 is selected. One of the four bits, as selected by the B field of the instruction word via CKB logic 56, is reset to a logic "0".

Bit Test (TBIT1): 001110XX

The contents of the memory location addressed by the X and Y registers 73 and 40 is selected. One of the four bits, as selected by the B field of the instruction word via CKB 56, is tested in the adder 50. A logical "1" in the selected bit will set status to a logical "1", via compare output to status on line 67.

Load X Register (LDX): 001111XX

The X or RAM page address register 73 is loaded from the B field of the instruction word. This is unconditional, and neither carry nor compare go to status logic 66.

Store and Increment (TAMIYC): 00100000

The contents of the accumulator 52 are stored in the RAM memory location addressed by the X and Y registers 73 and 40. After completion of the store operation, the Y register 40 is incremented by one. Unconditional; status is not affected.

Transfer Memory to Accumulator (TMA): 00100001

The contents of the RAM memory location addressed by the X and Y register 73 and 40 is unconditionally transferred into the accumulator 52. Memory data in the RAM is unaltered. Unconditional, and carry and compare do not go to status.

Transfer Memory to Y Register (TMY): 00100010

The contents of the RAM memory location addressed by the X and Y registers 73 and 40 is unconditionally transferred into the Y register 40. Memory data in the RAM is unaltered.

Transfer Y Register to Accumulator (TYA): 00100011

The Y register 40 is unconditionally transferred into the accumulator 52. Contents of the Y register 40 are unaltered.

Transfer Accumulator to Y Register (TAY): 00100100

The accumulator 52 is unconditionally transferred into the Y register 40. Accumulator contents are unaltered.

Memory and Accumulator Add (AMAAC): 00100101

The contents of the accumulator 52 are added to the contents of the RAM memory location addressed by the X and Y registers 73 and 40 with the resulting sum stored into the accumulator 52. Resulting carry information on line 67 is input to the status logic 66. A sum that is greater than fifteen will set status to a logic "1". The contents of the memory location in the RAM 25 are unaltered.

Compare Memory to Zero (MNEZ): 00100110

The Ram memory contents addressed by the X and Y registers 73 and 40 are compared to zero. Comparison information on line 67 is input to the status logic. Inequality between memory and zero will set status 66 to a logic "1".

Memory and Accumulator Subtract (SMAN): 00100111

The contents of the accumulator 52 are subtracted from the contents of the RAM memory location addressed by the X and Y registers 73 and 40 using 2's complement addition with the difference stored into the accumulator 52. Resulting carry information is input to status 66. Status will be set to logic "1" if the accumulator is less than or equal to the memory.

Load Incremented Memory (IMAC): 00101000

The contents of the RAM memory location addressed by the X and Y registers 73 and 40 is incremented by one and stored into the accumulator 52. The original contents of the RAM memory are unaltered. Resulting carry information is input via line 67 to the status logic 66. Status will be set to a logic "1" if the sum is greater than fifteen.

Accumulator Less than or Equal to Memory (ALEM): 00101001

The accumulator 52 is subtracted from the contents of the RAM memory location addressed by the X and Y registers 73 and 40 using 2's complement addition. Resulting carry information is input via line 67 to the status logic 66. Status equal to a logic "1" indicates that the accumulator is less than or equal to the memory. Memory and accumulator contents are unaltered.

Load Decremented Memory (DMAN): 00101010

The contents of the RAM memory location addressed by the X and Y registers 73 and 40 are decremented by one and oaded into the accumulator 52. Memory contents are unaltered. Resulting carry information is input to the status logic. If memory is greater than or equal to one, status will be set to log "1".

Increment Y register (TYC)

The contents of the Y register 40 are incremented by one. Resulting carry information is input to the status logic 66. A sum greater than fifteen will set status to a logic "1".

Decrement Y Register (DYN): 00101100

The contents of the Y register 40 are decremented by one. Resulting carry information is input to the status logic 66. If Y is greater than or equal to 1, status will be set to a logic "1".

2's Complement of the Accumulator (CPAIZ): 00101101

The contents of the accumulator 52 are substrated from zero using 2's complement addition. The result is stored in accumulator 52. Resulting carry information is input to the status logic 66. This operation is equivalent to complementing and incrementing the accumulator. If the accumulator contents are equal to zero, then status will be set to a logic "1".

Exchange Memory and Accumulator (EXMA): 00101110

The contents of the RAM memory location addressed by the X and Y registers 73 and 40 are exchanged with the accumulator 52. That is, the accumulator is stored into memory and memory is transferred into the accumulator.

Clear Accumulator (CLA): 00101111

The contents of the accumulator 52 are unconditionally set to zero.

Add Eight to the Accumulator (A8AAC): 00000001

The constant eight (8), as determined by bits R7 thru R4 of the instruction word, is added to the accumulator 52. Resulting carry information is input to the status logic 66. A sum greater than fifteen will set status to a logic "1".

Compare Y Register to the Accumulator (YNEA): 00000010

The contents of the Y register 40 are compared to the contents of the accumulators 52. Comparison information is input to the status logic 66. Inequality between the Y register and the accumulator will set status to a logic "1". The logic state of status 66-1 is also copied into the status latch 66-2.

Store Accumulator (TMA): 00000011

The contents of the accumulator 52 are stored into the RAM memory location addressed by the X and Y registers 73 and 40. Accumulator 52 contents are unaffected.

Store and Clear Accumulator (TAMZA): 00000100

The contents of the accumulator 52 are stored into the RAM memory location addressed by the X and Y registers 73 and 40. The accumulator 52 is then reset to zero.

Add Ten to the Accumulator (A10AAC): 00000101

The constant ten (10), as determined by bits R7 and R4 of the instruction word, is added to the accumulator 52.

Add Six to the Accumulator (A6AAC): 00000110

The constant six (6), as determined by bits R7 and R4 of the instruction word, is added to the contents of the accumulator 52. Resulting carry information is input to the status logic 66. A result greater than fifteen will set status to a logic "1".

Decrement Accumulator (DAN): 00000111

The contents of the accumulator 52 are decremented by one. Resulting carry information is input to the status logic 66. If accumulator is greater than or equal to one, status will be set to a logic "1".

Increment Accumulator (IAC): 00001110

The contents of the accumulator 52 are incremented by one.

Complement X Register (COMX): 00000000

The contents of the X or RAM page address register 73 are logically complemented.

Load External Inputs (TKA): 00001000

Data present on the four external K input lines 75 is transferred into the accumulator 52.

Test External Inputs (KNEZ): 00001001

Data on the external K input lines 75 is compared to zero. Comparison information is input to the status logic 66. Non-zero external data will set status to a logic "1".

Load Output Register (TDO): 00001010

The contents of the accumulator 52 and the status latch 66-1 are transferred to the output register 62. The register 62 can be decoded in 62 to supply data to as many as eight output lines 17 and is a primary register used in data output external to the chip. The contents of the Y register 40 are also decremented by one.

Reset D [Y] Output (RSTR): 00001100

If the contents of the Y register 40 are between 0 through 12 inclusive, then one of the D outputs will be reset to a logic "0". Selection of the D output is determined by the decoded contents of the Y register 40. For values greater than 12 in the Y register, the instruction is a no-op to the user.

Set D [Y] Output (SETR): 00001101

If the contents of the Y register 40 are between 0 through 12 inclusive, then one of the D outputs will be set to a logic "1". Selection of the D output is determined by the decoded contents of the Y register 40. For values greater than 12 in the Y register, the instruction is a no-op to the user.

Return (RETN): 00001111

When executed in the CALL mode, the contents of the subroutine register 43 are transferred into the program counter 36. Simultaneously, the contents of the buffer register 47 are transferred into the ROM page address register 46. This operation will return the system to the proper point after a subroutine has been executed.

When a return instruction is executed in the non-CALL mode, that is, when not executing a subroutine, it is a no-operation.

What is claimed is:

1. Apparatus *with self-test initiated at power-up, said apparatus* having a plurality of electrically operated devices including electrically operated visible indicia, a plurality of manually operable input means for entering functional commands, microprocessor means connected to the devices and receiving inputs from the input means, said microprocessor means containing a fixed, permanently programmed read-only-memory for storing instruction words which define operating sequences for the apparatus, the microprocessor means further including logic means for sequentially executing the instruction words to operate the devices in response to commands from the input means, *an off-on switch for controlling the supply of power to the apparatus*, the microprocessor means having self-contained test control means operable in response to actuation thereof *by actuation means* without external control equipment to energize at least some of said electrically operated devices in sequence, the test control means including a sequence of said instruction words in the read-only-memory, *the actuation means initiating said sequence of instruction words for self-test upon power-up of said apparatus by means of said off-on switch.*

2. Apparatus according to claim 1 wherein the visible indicia include a segmented display and wherein the test control means energizes each segment of the display.

3. Apparatus according to claim 1 wherein the manually operable input means are switches which include an array of rows and columns of keys and the test control means produce indications on the visible indicia of the row and column of key actuated.

4. Apparatus according to claim 2 wherein the visible indicia further include a plurality of lighted means each corresponding to a function of the apparatus, and the test control means actuates the lighted means in sequence.

5. Apparatus according to claim 1 wherein the test control means actuates all of the devices and visible indicia at the same time following actuation thereof in sequence.

6. An electrical apparatus in a self-contained housing without external control equipment, the apparatus having a plurality of electronic devices including means for performing operating functions and also including a plurality of visible indicia providing indications of the operating functions and information relating to operation thereof, the electrical apparatus having logic control means for energizing the electronic devices including the visible indicia in response to functional commands from manually-operable input means, the logic control means including a fixed-program read-only-memory for storing instruction words and logic means for sequentially executing the instruction words to energize the electronic devices, the improvement comprising self-contained test means *initiated by means other than said manually-operable input means*, wholly included in the logic control means within the housing and operable to actuate the electronic devices including the visible indica in a pattern.

7. Apparatus according to claim 6 wherein the input means includes an array of rows and columns of keys and the test means provides an indication by said visible indicia of the row and column of a key actuated.

8. Apparatus according to claim 6 wherein the visible indicia include a segmented display and wherein the test means energizes each segment of the display.

9. Apparatus according to claim 8 wherein the visible indicia further include a plurality of lighted devices each corresponding to a function of the apparatus, and the test means actuates the lighted devices in sequence.

10. Apparatus according to claim 6 wherein the test means and the logic control means both are implemented by a fixed-program single chip microprocessor device sharing common inputs and outputs.

*11. Apparatus according to claim 1 wherein said microprocessor means is a single-chip device.*

*12. Apparatus according to claim 1 wherein said microprocessor means contains a program counter coupled to said read-only-memory for addressing said read-only-memory and wherein said sequence of instruction words for self-test is addressed by said program counter.*

*13. Apparatus according to claim 6 wherein said logic control means contains a program counter coupled to said read-only-memory for addressing said read-only-memory, and wherein said test means includes a sequence of instruction words within said read-only-memory and addressed by said program counter.*

*14. Apparatus providing a complete electronic system and having a plurality of electrically operated devices including electrically operated visible indicia, a plurality of manually operable input means in the form of a keyboard of manually-operable keys for entering functional commands, microprocessor means connected to the devices and receiving inputs from the input means, said microprocessor means containing a fixed, permanently programmed read-only-memory for storing instruction words which define principal operating sequences for the system, the microprocessor means further including logic means for sequentially executing the instruction words to operate the devices in response to commands from the input means, the microprocessor means having self-contained test control means operable in response to actuation thereof by actuation means without external control equipment to energize at least some of said electrically operable devices in sequence, the test control means including a sequence of said instruction words in the read-only-memory, said actuation means for the test control means being separate from said keyboard whereby self-test is not actuated by said keys of the keyboard.*

*15. Apparatus according to claim 14 wherein said microprocessor means is a single-chip device.*

*16. Apparatus according to claim 14 wherein said microprocessor means contains a program counter coupled to said read-only-memory for addressing said read-only-memory and wherein said sequence of instruction words for self-test is addressed by said program counter.*

*17. Apparatus according to claim 1 or 14 wherein said apparatus is completely within a self-contained housing.*

*18. Apparatus according to claim 14 including an off-on switch for controlling the supply of power to said apparatus, and wherein said actuation means initiates said sequence of instruction words for self-test upon power-up of said apparatus by means of said off-on switch.*

*19. Apparatus providing a complete electronic system having a plurality of electrically operated devices including electrically operated visible indicia, a plurality of manually operable input means for entering functional commands, microprocessor means connected to the devices and receiving inputs from the input means, said microprocessor means containing a fixed, permanently programmed read-only-memory for storing instruction words which define principal operating sequences for the system, the microprocessor means further including logic means for sequentially executing the instruction words to operate the devices in response to commands from the input means, the microprocessor means having self-contained test control means operable in response to actuation thereof by actuation means separate from said manually-operable input means without external control equipment to energize at least some of said electrically operable devices in sequence, the test control means including a sequence of said instruction words in the read-only-memory.*

*20. Apparatus according to claim 19 wherein said microprocessor means is a single-chip device.*

*21. Apparatus according to claim 19 wherein said microprocessor means contains a program counter coupled to said read-only-memory for addressing said read-only-memory and wherein said sequence of instruction words for self-test is addressed by said program counter.*

*22. Self contained electronic apparatus providing a complete electronic system and having a plurality of electrically operated devices including electrically operated visible indicia, a plurality of manually operable input means in the form of a keyboard of manually-operable keys for entering functional commands, microprocessor means connected to the devices and receiving inputs from the input means, said microprocessor means containing a fixed, permanently programmed read-only-memory for storing instruction words which define principal operating sequences for the system, the microprocessor means further including logic means for sequentially executing the instruction words to operate the devices in response to commands from the input means, an off-on switch for controlling the supply of power to the system, the microprocessor means having self-contained test control means operable in response to actuation thereof by actuation means without external control equipment to energize at least some of said electrically operable devices in sequence, the test control means including a sequence of said instruction words in the read-only-memory, the actuation means initiating said sequence of instruction words for self-test upon power-up of said apparatus by means of said off-on switch, said actuation means for the test control means being separate from said keyboard whereby self-test is not actuated by said keys of the keyboard.*

*23. Apparatus according to claim 22 wherein said microprocessor means is a single-chip device.*

*24. Apparatus according to claim 22 wherein said microprocessor means contains a program counter coupled to*

*said read-only-memory for addressing said read-only-memory and wherein said sequence of instruction words for self-test is addressed by said program counter.*

*25. An electrical apparatus in a self-contained housing without external control equipment, the apparatus having a plurality of electronic devices including means for performing operating functions and also including a plurality of visible indicia providing indications of the operating functions and information relating to operation thereof, the electrical apparatus having logic control means for energizing the electronic devices including the visible indicia in response to functional commands from manually-operable input means, an off-on switch for controlling the supply of electrical power to said apparatus, the logic control means including a fixed-program read-only-memory for storing instruction words and logic means for sequentially executing the instruction words to energize the electronic devices, the improvement comprising self-contained test means initiated at power-up and wholly included in the logic control means within the housing and operable to actuate the electronic devices including the visible indicia in a pattern, said test means including actuation means responsive to operation of said off-on switch and separate from said manually-operable input means.*

* * * * *